United States Patent
Chen

(10) Patent No.: US 8,055,765 B2
(45) Date of Patent: Nov. 8, 2011

(54) SERVICE TAKE-OVER METHOD BASED ON APPARATUS DISASTER RECOVERY, SERVICE TRANSFER APPARATUS AND BACKUP MACHINE

(75) Inventor: Liang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 11/959,741

(22) Filed: Dec. 19, 2007

(65) Prior Publication Data

US 2008/0126501 A1    May 29, 2008

Related U.S. Application Data

(63) Continuation of application No. PCT/CN2007/000416, filed on Feb. 7, 2007.

(30) Foreign Application Priority Data

Apr. 18, 2006  (CN) .......................... 2006 1 0075706

(51) Int. Cl.
    *G06F 15/16* (2006.01)
(52) U.S. Cl. ......... 709/224; 709/227; 709/228; 370/223
(58) Field of Classification Search .................. 709/224, 709/227, 228, 239, 201; 370/223
    See application file for complete search history.

(56) References Cited

U.S. PATENT DOCUMENTS

| 6,185,680 | B1 * | 2/2001 | Shimbo et al. ................ 713/160 |
| 6,392,989 | B1 | 5/2002 | Jardetzky et al. |
| 6,393,485 | B1 * | 5/2002 | Chao et al. .................... 709/231 |
| 6,496,866 | B2 * | 12/2002 | Attanasio et al. .............. 709/239 |
| 6,941,366 | B2 * | 9/2005 | Antes et al. .................... 709/224 |
| 7,146,432 | B2 * | 12/2006 | Antes et al. .................... 709/239 |
| 7,340,530 | B2 * | 3/2008 | Godwin et al. ................. 709/232 |
| 7,487,232 | B1 * | 2/2009 | Matthews et al. .............. 709/223 |

(Continued)

FOREIGN PATENT DOCUMENTS

CN          1340928 A        3/2002

(Continued)

OTHER PUBLICATIONS

State Intellectual Property Office of The People's Republic of China, Examination Report in Chinese Patent Application No. 200780000396.8 (Jun. 7, 2010).

(Continued)

*Primary Examiner* — Khanh Dinh
(74) *Attorney, Agent, or Firm* — Leydig, Voit & Mayer, Ltd.

(57) ABSTRACT

A service take-over method based on apparatus disaster recovery, the method includes: transferring, by a service transfer apparatus, a service control message originally sent to a production machine to a backup machine which configures disaster recovery ability for the production machine, when detecting that the production machine gets a failure; starting, by the backup machine, a process of taking over the service control message transferred from the service transfer apparatus, when receiving the service control message meeting a prescribed condition transferred from the service transfer apparatus. In the present invention, when the apparatus configured with the disaster recovery ability gets a failure, the take-over speed of the service control message may increase so as to reduce the interruption time of the service as much as possible, thereby configuring the disaster recovery ability for the apparatus is realized.

16 Claims, 2 Drawing Sheets

U.S. PATENT DOCUMENTS

| | | |
|---|---|---|
| 2003/0012129 A1 | 1/2003 | Lee et al. |
| 2003/0154236 A1* | 8/2003 | Dar et al. ...................... 709/201 |
| 2005/0027859 A1* | 2/2005 | Alvisi et al. .................. 709/224 |
| 2005/0147028 A1 | 7/2005 | Na et al. |

FOREIGN PATENT DOCUMENTS

| | | |
|---|---|---|
| CN | 1366242 A | 8/2002 |
| CN | 1464396 A | 12/2003 |
| CN | 1567737 A | 1/2005 |
| CN | 1609814 A | 4/2005 |
| CN | 1750476 A | 3/2006 |
| WO | WO 01/97436 A2 | 12/2001 |

OTHER PUBLICATIONS

State Intellectual Property Office of The People's Republic of China, English Translation of Written Opinion of the International Searching Authority in International Patent Application No. PCT/CN2007/000416 (May 17, 2007).

* cited by examiner

SERVICE TAKE-OVER METHOD BASED ON APPARATUS DISASTER RECOVERY, SERVICE TRANSFER APPARATUS AND BACKUP MACHINE

CROSS-REFERENCE TO RELATED APPLICATIONS

The present application is a continuation of PCT Application No. PCT/CN2007/000416, filed on Feb. 7, 2007 and entitled "SERVICE TAKE-OVER METHOD BASED ON APPARATUS DISASTER RECOVERY, SERVICE TRANSFER APPARATUS AND BACKUP MACHINE", which claims the priority of Chinese Patent Application No. 200610075706.X, filed on Apr. 18, 2006 and entitled "SERVICE TAKE-OVER METHOD BASED ON APPARATUS DISASTER RECOVERY, SERVICE TRANSFER APPARATUS AND BACKUP MACHINE". All of these applications are incorporated herein by reference.

FIELD OF THE INVENTION

The present invention relates to the technical field of disaster recovery in a communication system, and more particularly, to a service take-over method based on apparatus disaster recovery, a service transfer apparatus and a backup machine.

BACKGROUND OF THE INVENTION

Communication apparatuses with service processing ability are provided with disaster recovery ability respectively, so as to ensure that a communication system can provide communication service safely and reliably. The operating principle of the disaster recovery is as follows: providing a corresponding backup machine for a production machine and maintaining the synchronization of service data and configuration mechanism between the backup machine and the production machine; if the production machine gets a failure in the communication process, the backup machine takes over the production machine to continue to provide communication service processing ability, so as to guarantee to provide the communication service continuously.

But at present, if the production machine gets a failure in the communication process, a manual take-over manner is generally used to complete the process of the backup machine talking over the production machine to continue to provide the communication service processing ability. That is, a failure monitoring apparatus is configured in advance to monitor operating states of the production machine and the related peripheral apparatuses, and if the network administrator finds that the failure monitoring apparatus sends out alarm information, then when they determine that the production machine gets a failure by analyzing the alarm information, related processing measures may be taken to complete the process of the backup machine taking over the production machine to continue to provide the communication service processing ability. The following will briefly illustrate the main process of completing the process of the backup machine taking over the production machine to continue to provide the communication service processing ability in a manual take-over manner.

FIG. 1 is a topological diagram of a simple communication system configured with disaster recovery ability, in which the process from a production machine getting a failure to a backup machine talking over to continue to provide the communication service processing ability may be mainly divided into three stages: failure discovering stage, service switching stage and backup machine take-over stage. The main process to complete the three stages in a manual take-over manner is as follows:

1. Failure Discovering Stage

The network administrator determines whether the production machine gets failure or not by analyzing alarm information sent out by the failure monitoring apparatus, which is used for monitoring whether the production machine, a service access apparatus and other related communication apparatus get failure. If the failure of the production machine is affirmed after the analyzing, then the following service switching stage is performed.

Certainly, the network administrator can also determine the failure occurring in the production machine based on the complaint of the subscriber received by the customer service center.

2. Service Switching Stage

After the network administrator determines that the production machine gets a failure, they switch service control messages sent from the service access apparatus or other related intermediate communication apparatus to the production machine, to the backup machine to be processed. In the disaster recovery technology, service control messages generally refer to control message or signaling transmitted before the establishment of a communication. There are different service switching manners to complete switching the service control message originally sent to the production machine to the backup machine to be processed. For example, when the production machine and the backup machine are both Service Control Point (SCP) apparatuses, the service switching manners may be two types as follows:

| Apparatus for performing service switching | Service access manner | Service switching manner |
|---|---|---|
| Service Switching Point (SSP) or other communication apparatus accessing in a signaling manner | CAMEL/INAP-TCAP-MTP-SS7/SS1 signaling access | the network administrator modifies the destination signaling address in the SSP or intermediate communication apparatus |
| Service Management Point (SMP) or other communication apparatus accessing in data manner | TCP-IP access | the network administrator modifies the destination IP address in the SMP or intermediate communication apparatus |

3. Backup Machine Take-Over Stage

A backup machine is started manually by the network administrator. Based on the self-stored service data and configuration mechanism synchronized with the production machine, the backup machine takes over the service processing ability of the production machine, so as to continue to provide communication service processing ability for the whole communication process to ensure to provide the communication service continuously.

When a backup machine provides the disaster recovery ability for several production machines at the same time, the network administrator may also need to select the corresponding service data and configuration mechanism in the service data and the configuration mechanism stored in the backup machine, so as to take over the corresponding production machine getting a failure to continue to provide service processing ability.

In fact, one of the main objects for configuring the disaster recovery ability in the communication system is to ensure reliability and safety of the communication service as much as possible, so as to reduce the interruption time of the communication service as much as possible. However, for the above mentioned process of implementing service switching in a manual take-over manner, the time required for the service switching process depends completely on the time required for the manual intervention because there are several manual interventions in the process. Therefore, due to excessive manual interventions, the communication service will be not taken over for a long time, and thereby the communication system can not be configured with the disaster recovery ability.

SUMMARY OF THE INVENTION

An embodiment of the present invention provides a service take-over method based on apparatus disaster recovery. When an apparatus configured with disaster recovery ability gets a failure, the service take-over method increases service take-over speed to reduce interruption time of the service as much as possible, so as to configure disaster recovery ability for the apparatus.

Correspondingly, embodiments of the present invention also provide a service transfer apparatus and a backup machine.

An embodiment of the present invention provides a service take-over method based on apparatus disaster recovery, the method including: transferring, by a service transfer apparatus, a service control message originally sent to a production machine to a backup machine which configures disaster recovery ability for the production machine, when detecting that the production machine gets a failure; starting, by the backup machine, a process of taking over the service control message transferred from the service transfer apparatus, when receiving the service control message meeting a prescribed condition transferred from the service transfer apparatus.

An embodiment of the present invention provides a service transfer apparatus, the service transfer apparatus including: a failure detecting unit for detecting whether a production machine gets a failure; a service transferring unit for transferring a service control message originally sent to a production machine to a backup machine which configures disaster recovery ability for the production machine when the failure detecting unit detects that the production machine gets a failure.

An embodiment of the present invention provides a backup machine, the backup machine including: a transferred service receiving unit for receiving a service control message transferred from a service transfer apparatus; a take-over starting unit, for starting a process of taking over the service control message transferred from the service transfer apparatus when the transferred service receiving unit receives the service control message meeting a prescribed condition transferred from the service transfer apparatus.

In the embodiments of the present invention, the service transfer apparatus transfers the service control message originally sent to the production machine to the backup machine configuring the disaster recovery ability for the production machine by taking the detection of the failure of the production machine as the triggering mechanism of the service transferring. The backup machine takes the service control message meeting the prescribed condition transferred from the service transfer apparatus as the triggering mechanism of service take-over processing. The backup machine starts the process of taking over the service control message transferred from the service transfer apparatus when receiving the service control message meeting the prescribed condition transferred from the service transfer apparatus. Thus, excessive manual interventions are avoided in the process from the production machine getting a failure to the backup machine taking over to continue to provide the communication service processing ability in the telecom disaster recovery system. Thereby, automatic service control message transferring and take-over is realized; thus the take-over speed of the service control message is increased, the interruption time of the communication service is reduced, and the disaster recovery ability for the apparatus is configured.

BRIEF DESCRIPTIONS OF THE DRAWINGS

The principle, the particular implementation, and the corresponding beneficial effects of the embodiments of present invention will be described in detail in conjunction with the drawings in which.

DETAILED DESCRIPTIONS OF THE EMBODIMENTS

In view of the defects in the prior art: due to excessive manual interventions in three key stages from the production machine getting a failure to the backup machine taking over to continue to provide communication service processing ability, the communication service can not be taken over for a long time, and thus disaster recovery ability can not be configured for the communication system, the technical solution of the embodiments of the present invention proposes to introduce automatic processing mechanism in the three key stages from the production machine getting a failure to the backup machine taking over to continue to provide communication service processing ability, thereby manual interventions in the whole process of service take-over are avoided so as to eliminate the negative effect of the manual interventions: thus the service take-over speed of the backup machine is increased, the interruption time of the communication service is reduced to the maximum extent, the disaster recovery ability for the apparatus is configured.

Figure 1:
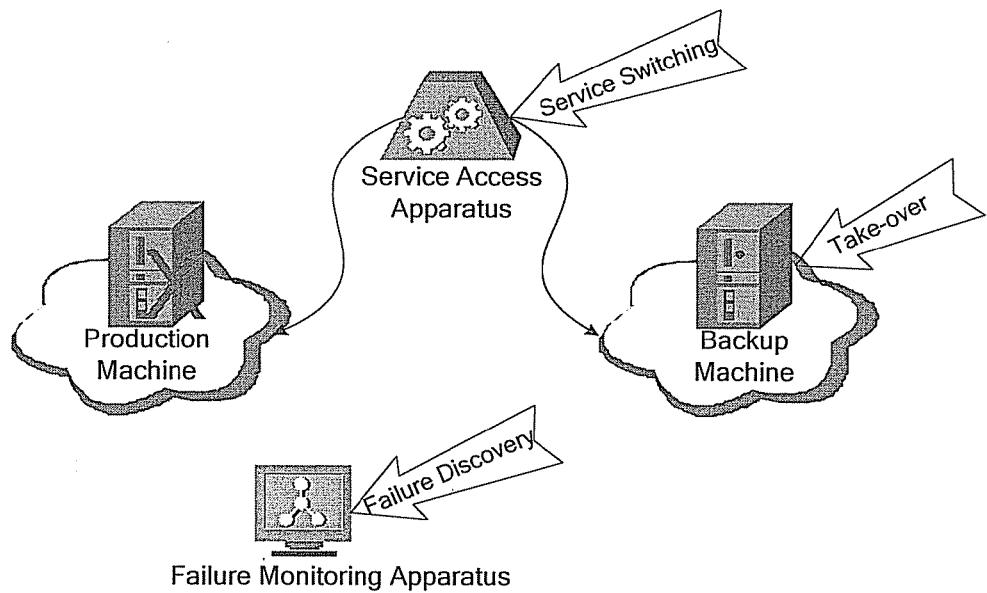
FIG. 1 is a topological diagram of a simple communication system configured with disaster recovery ability.
Figure 2:
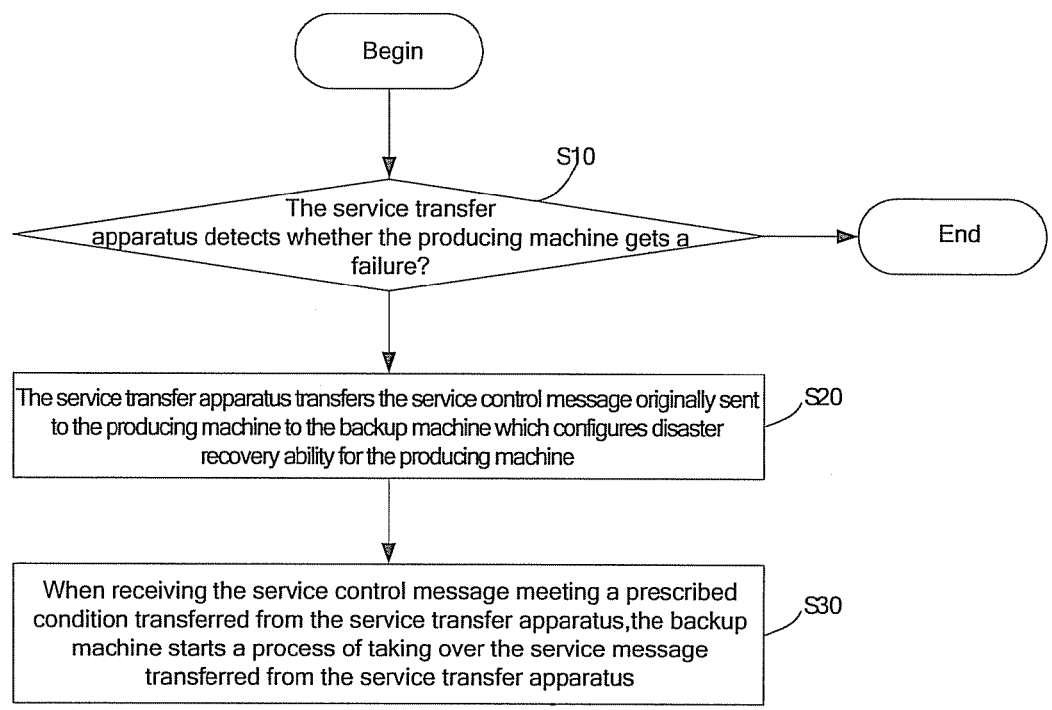
FIG. 2 is a flow chart of the main principle of a service take-over method based on apparatus disaster recovery according to an embodiment of the present invention.

FIG. 2 is a flow chart of the main principle of a service take-over method based on apparatus disaster recovery according to an embodiment of the present invention, and the process is as follows:

Block S10, a service transfer apparatus detects whether a production machine gets a failure. If so, the process turns to the following block S20, otherwise the process ends. Because the production machine will cut off the connections with the outside and block outgoing communication links automatically when getting a failure, which appears to be a production machine failure for the outside, the service transfer apparatus can detect whether the production machine gets a failure or not through at least the following two manners:

1) The service transfer apparatus detects in a prescribed period whether the production machine sends a message (e.g. heartbeat message) for confirming that the production machine works normally. If the service transfer apparatus detects that the production machine has sent the message for confirming that the production machine works normally in the prescribed period, the service transfer apparatus determines that the production machine works normally. On the other hand, if detecting that the production machine has not sent the message for confirming that the production machine works normally in the prescribed period, the service transfer apparatus determines that the production machine gets a failure.

2) The service transfer apparatus sends a request message to the production machine, and detects whether the service transfer apparatus can receive a response message returned by the production machine in a prescribed period. If the service transfer apparatus does not receive the response message returned by the production machine in the prescribed period, the service transfer apparatus can determine that the production machine gets a failure.

For example, if the service transfer apparatus is a router or a service access apparatus which accesses the production machine in an IP manner, then the service transfer apparatus can detect route failure of the production machine (such as IP access module failure, Ethernet network card failure or network storm failure, etc.) based on the condition of communication timeout.

Taking another example, if the service transfer apparatus is an intermediate signaling transfer apparatus (including Signaling Transport Point (STP), and Signaling Gateway (SG), etc.) or a service access apparatus accessing the production machine in the signaling manner, then the service transfer apparatus detects the link failure of the production machine through the link detecting signaling in a regular period. When detecting that the signaling point cannot be accessed, the service transfer apparatus considers that the production machine gets a failure. Thus, the service transfer apparatus can detect signaling access module failure of the production machine, and can also detect such failures as blocking automatically outgoing communication links.

Block S20, the service transfer apparatus transfers the service control message, originally sent to the production machine, to the backup machine which configures the disaster recovery ability for the production machine.

If the service transfer apparatus is a router, the router may transfer the service control message, originally sent to the production machine, to the backup machine based on a dynamic routing protocol, such as Virtual Router Redundancy Protocol (VRRP). Because the router supports the implementation of the standard dynamic routing protocol, when the router detects that the production machine gets a failure, the router selects a new IP address as the IP address of the backup machine automatically when reconnecting the backup machine. Therefore, switching to the backup machine is implemented automatically, so as to transfer the service control message, originally sent to the production machine, to the backup machine.

If the service transfer apparatus is a service access apparatus which accesses the production machine in the IP manner, the service access apparatus may transfer the service control message, originally sent to the production machine, to the backup machine in the following two manners:

1) The service access apparatus transfers the service control message, originally sent to the production machine, to the backup machine in the manner of setting the IP address of the backup machine as a spare IP address of the production machine. That is, the service access apparatus which accesses the production machine in the IP manner sets a spare IP address for the production machine in advance, the spare IP address for the production machine being the IP address of the backup machine. Therefore, when the service access apparatus detects that the production machine gets a failure, the service access apparatus will try to connect to the spare IP address automatically, thereby switching to the backup machine automatically so as to send the service control message, originally sent to the production machine, to the backup machine.

2) The service access apparatus transfers the service control message, originally sent to the production machine, to the backup machine in a float IP address manner. As for this manner, it is required that the backup machine and the production machine are within the same network segment, but there is no special request for the service access apparatus. Because the backup machine and the production machine are installed within the same network segment (connectable through a bridge apparatus), the production machine not only possesses a physical IP address for itself, but also adopts another float IP address, and each service access apparatus accessing the production machine in the IP manner connects to the float IP address. For example, the physical IP address of the production machine is 10.0.0.101, and the physical IP address of the backup machine is 10.0.0.102, both of their masks are 255.255.255.0. In order to realize the automatic switching between the IP addresses of the production machine and the backup machine, the production machine adopts a float IP address: 10.0.0.100. The production machine occupies the float IP address in normal working state, and other external devices also connect to the float IP address. If the production machine gets a failure, the float IP address will be occupied by the backup machine, and when other external devices re-establish a connection, the external devices will connect to the backup machine through the float IP address. Thus, when the production machine gets a failure, the backup machine will bind to the float IP address automatically, and the service access apparatus will reconnect the float IP address, thereby establishing a connection with the backup machine and transferring the service control message, originally sent to the production machine, to the backup machine.

If the service transfer apparatus is an intermediate signaling transfer apparatus (such as STP or SG) or a service access apparatus accessing the production machine in the signaling manner, the service transfer apparatus may transfer the service control message, originally sent to the production machine, to the backup machine in the manner of setting the signaling point of the backup machine as a spare signaling point of the production machine. That is, the intermediate signaling transfer apparatus or a service access apparatus accessing the production machine in the signaling manner utilizes a spare signaling point function (the standard function of the No. 7 signaling network) to set the signaling point of the backup machine as a spare signaling point of the production machine in advance. Thus, when detecting in the above process that the production machine gets a failure, the intermediate signaling transfer apparatus or a service access apparatus accessing the production machine in the signaling manner will transfer the service control message, originally sent to the production machine, to the corresponding backup machine automatically.

Block S30, when the backup machine receives the above service control message meeting a prescribed condition transferred from the service transfer apparatus, the backup machine starts the process of taking over the service control message transferred from the service transfer apparatus.

That is, the embodiment of the present invention requires that the backup machine can start software application automatically when receiving the service control message transferred from the service transfer apparatus, and change its state into the production machine state, thereby realizing the process of taking over the service control message transferred from the service transfer apparatus. The backup machine may be in hardware running state when the backup machine does not take over the service, and the upper software is not in Ready state, so a triggering mechanism is required to trigger the upper software to run, thereby to perform the process of taking over the service control message transferred from the service transfer apparatus.

The backup machine receiving the service control message meeting the prescribed condition transferred from the service transfer apparatus may refer to the backup machine receiving the service control message transferred from the service transfer apparatus for the first time, the backup machine receiving the service control message transferred from the service transfer apparatus in prescribed continuous times (such as 3 times), or the backup machine continuously receiving the service control message transferred from the service transfer apparatus within a prescribed period (such as within 10 ms).

If the service transfer apparatus is a router or a service access apparatus which accesses the production machine in the IP manner, when the router or the service access apparatus which accesses the production machine in the IP manner reconnects to the backup machine, the backup machine will be started automatically to take over the service control message transferred from the router or the service access apparatus which accesses the production machine in the IP manner. If the service transfer apparatus is an intermediate signaling transfer apparatus or a service access apparatus accessing the production machine in the signaling manner, when the backup machine receives the service control message transferred from the intermediate signaling transfer apparatus or the service access apparatus accessing the production machine in the signaling manner, the backup machine will be started automatically to take over the service control message transferred from the intermediate signaling transfer apparatus or the service access apparatus accessing the production machine in the signaling manner.

Furthermore, when the backup machine configures the disaster recovery ability for at least two production machines (i.e., service data and configuration mechanisms corresponding to different production machines respectively are stored in the backup machine at the same time), the backup machine selects the corresponding service data and the configuration mechanism according to a service property message transferred from the service transfer apparatus to take over the transferred service control message. When the service transfer apparatus is a router or a service access apparatus which accesses the production machine in the IP manner, the process of the backup machine starting the process of talking over the service control message transferred from the service transfer apparatus includes:

Firstly, the backup machine selects the corresponding service data and configuration mechanism from a database according to an upper layer protocol (such as register, login) of the service control message transferred from the service transfer apparatus; and then, the backup machine starts the process of taking over the service control message transferred from the service transfer apparatus based on the selected service data and configuration mechanism.

When the service transfer apparatus is an intermediate signaling transfer apparatus or a service access apparatus accessing the production machine in the signaling manner, the process of the backup machine starting the process of taking over the service control message transferred from the service transfer apparatus includes:

Firstly, the backup machine selects the corresponding service data and the configuration mechanism from a database according to a Global Title (GT) contained in the service control message transferred from the service transfer apparatus. Because when the intermediate signaling transfer apparatus or the service access apparatus accessing the production machine in the signaling manner transfer the service control message to the spare signaling point, only a Destination Point Code (DPC) of the outgoing service control message is changed (the GT is not changed), that is, the GT carried in the service control message (transferred from the intermediate signaling transfer apparatus or the service access apparatus accessing the production machine in the signaling manner) received by the backup machine is still the GT of the original production machine. Therefore, the backup machine may select the correct service data and configuration mechanism according to the GT carried in the received service control message;

then, the backup machine starts the process of taking over the service control message transferred from the service transfer apparatus based on the selected service data and configuration mechanism.

The production machine of the present invention includes but not limited to a Service Control Point (SCP) in an intelligent network, a Voucher Center (VC) and so on. The above service control message generally refers to a control signaling and control message, etc. transmitted before the establishment of the communication.

In summary, the technical solution of the embodiment of the present invention can eliminate excessive manual interventions within the disaster recovery system in the process from the production machine getting a failure to the backup machine taking over the service, so as to reduce the interruption time of the service as much as possible. In the case of the backup machine not setting a take-over condition in advance, the interruption time of the communication service will be reduced to a second level by using the technical solution of the embodiment of the present invention. It should be noted that the interruption time of the communication service includes the time for transferring the service control message, the time for reconnecting the service transfer apparatus and backup machine, and the time for starting the backup machine. By using the technical solution of the embodiment of the present invention, the time for STP transferring the service control message is a millisecond level, the time for the router transferring the service control message is the second level, and if the mechanism of always making the backup machine turned on is employed, the start time of the hardware of the backup machine may be eliminated. Therefore, through combining the prior function and the added function of the disaster recovery related apparatus to realize the automatic service take-over manner without manual intervention, the interruption time of the communication service will be greatly reduced.

Figure 3:
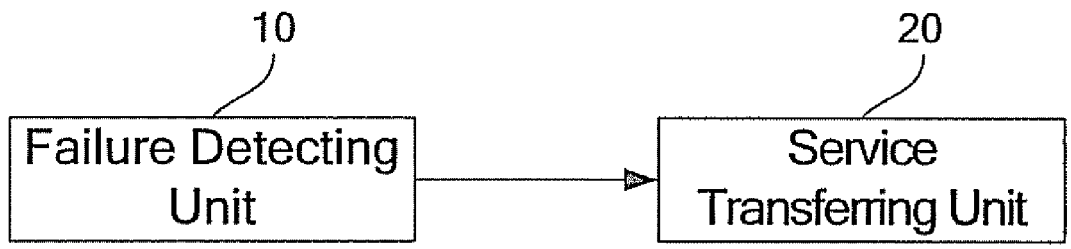
FIG. 3 is a block diagram of the main construction of a service transfer apparatus according to an embodiment of the present invention.

Correspondingly, some embodiments of the present invention further provide a service transfer apparatus and a backup machine corresponding to the above mentioned service take-over method based on apparatus disaster recovery. FIG. 3 is a block diagram of the main construction of a service transfer apparatus according to an embodiment of the present invention, and the service transfer apparatus includes a failure detecting unit 10 and a service transferring unit 20. The functions of the two units are as follows:

The failure detecting unit 10 is mainly adapted for detecting whether a production machine gets a failure or not, the detecting manner refers to the corresponding description in the above method;

The service transferring unit 20 is mainly adapted for transferring a service control message, originally sent to the production machine, to a backup machine which configures disaster recovery ability for the production machine when the failure detecting unit 10 detects that the production machine gets a failure. Please refer to the corresponding description in the above method for the particular manner of the service transferring unit 20 sending the service control message originally sent to the production machine to the backup machine.

Figure 4:
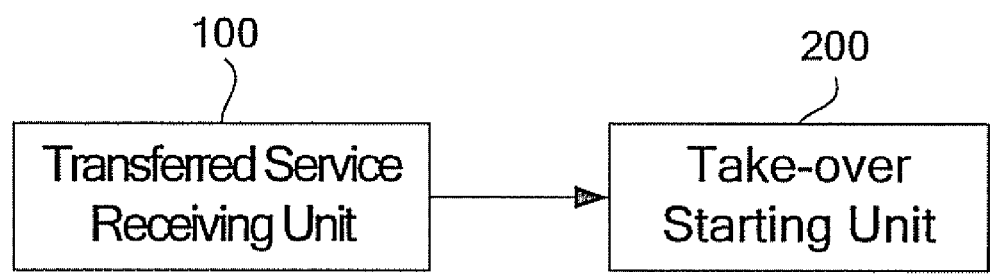
FIG. 4 is a block diagram of the main construction of a backup machine according to an embodiment of the present invention.

FIG. 4 is a block diagram of the main construction of a backup machine according to an embodiment of the present invention, and the backup machine includes a transferred service receiving unit 100 and a take-over starting unit 200. The functions of the two units are as follows:

The transferred service receiving unit 100 is mainly adapted for receiving a service control message transferred from a service transfer apparatus;

the take-over starting unit 200 is mainly adapted for starting a process of taking over the service control message transferred from the service transfer apparatus when the transferred service receiving unit 100 receives the service control message meeting a prescribed condition transferred from the service transfer apparatus. Please refer to the corresponding description in the above method for the particular explanation with respect to the service control message meeting the prescribed condition and the main manner for starting the process of taking over the transferred service control message.

It should be noted that other particular technical details of the service transfer apparatus and the corresponding backup machine provided in the embodiments of the present invention may refer to the description of the related technical details in the method embodiment of the present invention, and the details are not discussed herein.

Apparently, those skilled in the art can make various modifications and changes without departing from the spirit and the scope of the present invention. Thus, if such modifications and changes of the embodiments of the present invention fall within the scope of the claims of the present invention and its equivalence then the present invention also intends to cover those modifications and changes.

What is claimed is:

1. A method for taking over service, comprising:
   detecting, by a service transfer apparatus, whether a production machine gets a failure;
   transferring, by the service transfer apparatus, a service control message, originally sent to the production machine, to a backup machine which configures disaster recovery ability for the production machine, when detecting that the production machine gets a failure; and
   when the received service control message meets a prescribed condition, triggering, by the service control message, the software of the backup machine to run to start a process of taking over the service control message transferred from the service transfer apparatus based on service data and a configuration mechanism synchronized with the production machine stored in the backup machine;
   wherein the detecting that the production machine gets a failure comprises:
      determining that the production machine gets a failure if the service transfer apparatus does not receive a message returned from the production machine for confirming that the production machine works normally in a prescribed period.

2. The method of claim 1, wherein the detecting that the production machine gets a failure comprises:
   sending a request message to the production machine;
   determining that the production machine gets a failure if the service transfer apparatus does not receive a response message returned from the production machine in a prescribed period.

3. The method of claim 1, wherein the service transfer apparatus is a router.

4. The method of claim 3, wherein the router transfers the service control message to the backup machine based on a dynamic routing protocol.

5. The method of claim 1, wherein the service transfer apparatus is a service access apparatus which accesses the production machine in an IP manner.

6. The method of claim 5, wherein the service access apparatus transfers the service control message to the backup machine in a manner of setting an IP address of the backup machine as a spare IP address of the production machine.

7. The method of claim 5, wherein the service access apparatus transfers the service control message to the backup machine in a manner of float IP address.

8. The method of claim 1, wherein the service transfer apparatus is an intermediate signaling transfer apparatus or a service access apparatus accessing the production machine in a signaling manner.

9. The method of claim 8, wherein the service transfer apparatus transfers the service control message to the backup machine in a manner of setting a signaling point of the backup machine as a spare signaling point of the production machine.

10. The method of claim 1, wherein the receiving the service control message meeting the prescribed condition comprises:
    receiving the service control message for the first time.

11. The method of claim 1, wherein the receiving the service control message meeting the prescribed condition comprises:
    receiving the service control message in prescribed continuous times.

12. The method of claim 1, wherein the receiving the service control message meeting the prescribed condition comprises:
    receiving the service control message within a prescribed period continuously.

13. The method of claim 1, wherein triggering the software of the backup machine to run to start the process of taking over the service control message transferred from the service transfer apparatus is performed when the backup machine configures the disaster recovery ability for at least two production machines and comprises:
    selecting a corresponding service data and configuration mechanism according to the upper layer protocol of the service control message transferred from the service transfer apparatus; and starting the process of taking over the service control message transferred from the service transfer apparatus based on the selected service data and configuration mechanism.

14. The method of claim 1, triggering the software of the backup machine to run to start the process of taking over the service control message transferred from the service transfer apparatus is performed when the backup machine configures the disaster recovery ability for at least two production machines and comprises:

selecting a corresponding service data and configuration mechanism according to a global title in the service control message transferred from the service transfer apparatus; and starting the process of taking over the service control message transferred from the service transfer apparatus based on the selected service data and configuration mechanism.

15. A service transfer apparatus, comprising:

a failure detecting unit, adapted for detecting whether a production machine gets a failure by the following steps: determining that the production machine gets a failure if the service transfer apparatus does not receive a message returned from the production machine for confirming that the production machine works normally in a prescribed period;

a service transferring unit, adapted for transferring a service control message, originally sent to the production machine, to a backup machine which configures disaster recovery ability for the production machine when the failure detecting unit detects that the production machine gets a failure; and wherein when the received service control message in the backup machine meets a prescribed condition, the service control message triggers the software of the backup machine to run to start a process of taking over the service control message transferred from the service transfer apparatus based on service data and a configuration mechanism synchronized with the production machine stored in the backup machine.

16. A backup machine, comprising:

a transferred service receiving unit, adapted for receiving a service control message, originally sent to a production machine, transferred from a service transfer apparatus when the production machine gets a failure by determining that the production machine gets the failure if the service transfer apparatus does not receive a message returned from the production machine for confirming that the production machine works normally in a prescribed period;

a take-over starting unit, adapted for changing the software of the backup machine to run to start a process of taking over the service control message based on service data and a configuration mechanism synchronized with the production machine stored in the backup machine when the transferred service receiving unit receives the service control message meeting a prescribed condition.

* * * * *